United States Patent
Battles et al.

(10) Patent No.: US 7,265,790 B2
(45) Date of Patent: Sep. 4, 2007

(54) SYSTEM AND METHOD FOR SETTING AN IMAGE CAPTURE DEVICE TO AN OPERATIONAL MODE

(75) Inventors: Amy E. Battles, Windsor, CO (US); David K. Campbell, Loveland, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 757 days.

(21) Appl. No.: 10/614,322

(22) Filed: Jul. 7, 2003

(65) Prior Publication Data
US 2005/0007467 A1    Jan. 13, 2005

(51) Int. Cl.
*H04N 5/225* (2006.01)
(52) U.S. Cl. .............. 348/374; 348/208.1; 396/50
(58) Field of Classification Search ......... 348/373, 348/374, 375, 207.1, 207.11, 376, 333.06, 348/220.1, 208.1, 208.2, 239, 771; 358/906; 396/300, 50, 53
See application file for complete search history.

(56) References Cited

U.S. PATENT DOCUMENTS

| | | | | |
|---|---|---|---|---|
| 6,094,215 A | * | 7/2000 | Sundahl et al. ............... 348/42 |
| 6,494,093 B2 | * | 12/2002 | McCall et al. ................ 73/497 |
| 6,563,535 B1 | * | 5/2003 | Anderson ................ 348/231.2 |
| 6,626,040 B1 | * | 9/2003 | Pereira et al. ........... 73/514.38 |
| 6,873,357 B2 | * | 3/2005 | Fuchimukai et al. .... 348/208.2 |
| 2001/0019664 A1 | * | 9/2001 | Pilu ........................... 396/431 |
| 2004/0004671 A1 | * | 1/2004 | Takahashi ................... 348/375 |
| 2004/0259590 A1 | * | 12/2004 | Middleton ............... 455/556.1 |

FOREIGN PATENT DOCUMENTS

| | | |
|---|---|---|
| JP | 05-328206 | 12/1993 |
| JP | 09-023375 | 1/1997 |
| JP | 2000-029988 | 1/2000 |

\* cited by examiner

*Primary Examiner*—Vivek Srivastava
*Assistant Examiner*—Nelson D. Hernandez

(57) ABSTRACT

In an embodiment, a method sets an image capture device to one of a plurality of available operational modes for the image capture device. The method comprises determining an angle of pitch orientation of the image capture device, and setting the image capture device to the one of the plurality of operational modes if the angle of pitch orientation is within a predetermined angle range associated with the one of the plurality of operational modes.

18 Claims, 2 Drawing Sheets

SYSTEM AND METHOD FOR SETTING AN IMAGE CAPTURE DEVICE TO AN OPERATIONAL MODE

FIELD OF THE INVENTION

The present invention relates to image capture devices, and in one embodiment, to systems and methods for setting an image capture device to an operational mode.

BACKGROUND

Image capture devices are operable to capture images (e.g., an object scene) in the form of image data (e.g., electronic image data). Non-limiting examples of existing image capture devices include digital cameras, digital camcorders, scanning devices, and/or the like.

Typically, an image capture device is set to one of a plurality of available modes of operation. For example, some existing image capture devices may be operated in a mode for capturing images (referred to herein as the "image capture" mode) or a mode for reviewing images (referred to herein as the "image review" mode). When in image capture mode, an image capture device normally enables a user to capture an image by activating image capture operations for the device (e.g., by depressing a shutter release button). Also when in image capture mode, an image capture device may provide a preview of the image that will be captured by the device if the user activates the aforementioned image capture operations. This real-time preview is typically provided by a display and/or optical viewfinder of the image capture device. When in the image review mode, the image capture device normally enables a user to review already captured images via the display of the image capture device. The image capture device may also enable the user to edit the images when the image capture device is in image review mode.

With existing image capture devices, a user is forced to manually set the operational mode for the image capture device. For example, existing image capture devices typically comprise a dial, switch or other control through which the user sets the operational mode for the device.

However, having responsibility for setting the operational mode of the camera may be a source of frustration to the user. For example, a user may be unable to capture an image when the user desires to do so because the user did not remember to set the image capture device to the appropriate mode for capturing images. Assuming the image the user wanted to capture was fleeting, by the time the user sets the device to the appropriate mode, the image the user wanted to capture may have passed.

BRIEF SUMMARY OF THE INVENTION

In an embodiment, a method sets an image capture device to one of a plurality of available operational modes for the image capture device. The method comprises determining an angle of pitch orientation of the image capture device, and setting the image capture device to the one of the plurality of operational modes if the angle of pitch orientation is within a predetermined angle range associated with the one of the plurality of operational modes.

DETAILED DESCRIPTION OF THE INVENTION

Figure 1:
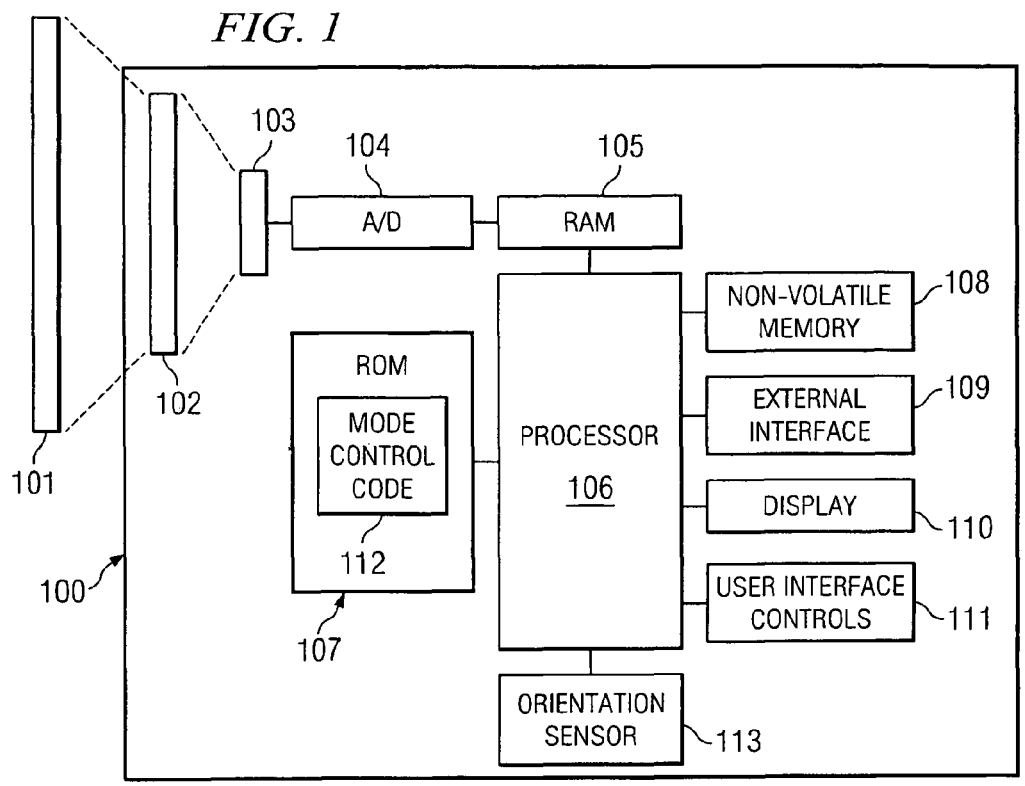
FIG. 1 depicts a digital camera according to representative embodiments.

Referring now to the drawings, FIG. 1 depicts digital camera 100 that may operate in a plurality of modes that are controlled by representative embodiments. Although representative embodiments are described in terms of a digital camera, the present invention is not so limited. The present invention may be implemented in association with any suitable imaging device. Digital camera 100 operates when light is reflected from object(s) 101 and is received by optical subsystem 102. Optical subsystem 102 optically reduces the image of object 101 to focus the image on an arrayed image capture element such as charge-coupled device (CCD) 103. CCD 103 is typically implemented as a two-dimensional array of photosensitive capacitive elements. When light is incident on the photosensitive elements of CCD 103, charge is trapped in a depletion region of the semiconductor material of the elements. The amount of charge associated with the photosensitive capacitive elements is related to the intensity of light incident on the respective elements received over a sampling period. Accordingly, the image is captured by determining the intensity of incident light at the respective photosensitive capacitive elements via sampling the elements.

The analog information produced by the photosensitive capacitive elements is converted to digital information by analog-to-digital (A/D) conversion unit 104. A/D conversion unit 104 may convert the analog information received from CCD 103 in either a serial or parallel manner. The converted digital information may be stored in memory 105 (e.g., random access memory (RAM)). The digital information may be processed by processor 106 according to control software stored in read only memory (ROM) 107 (e.g., PROM, EPROM, EEPROM, and/or the like). For example, the digital information may be compressed according to the Joint Photographic Experts Group (JPEG) standard. Additionally or alternatively, other circuitry (not shown) may be utilized to process the captured image such as an application specific integrated circuit (ASIC). The processed digital information may be stored in non-volatile memory 108 (e.g., a flash memory card). The user may download digital images from non-volatile memory 108 to, for example, a personal computer using external interface 109.

Digital camera 100 may operate in a plurality of modes. In the first mode, digital camera 100 may be operated to capture digital images. The user may direct digital camera 100 towards various objects or scenes. In response, digital camera 100 may continuously capture an image of the object or scene and provide the image on display 110 in real-time. By doing so, digital camera 100 enables the user to determine the nature of the image to be stored in memory when the user clicks the appropriate control of user interface controls 111 (e.g., a touch screen, keys, buttons, dials, and/or the like). Assuming the user does so, the image is stored in non-volatile memory 108 and digital camera 100 then continues to display the current image being captured by CCD 103.

Digital camera 100 may operate in a second mode to review and/or manage the digital images stored in non-volatile memory 108. Specifically, the storage capacity of non-volatile memory 108 is usually limited for a variety of reasons. Accordingly, it is occasionally appropriate for a user to delete selected digital images from non-volatile memory 108. The user may delete images that are substantial duplicates of other images, of relatively poor quality, old, previously downloaded to another system, and/or the like. To facilitate the management of digital images, digital camera 100 includes display 110 (e.g., a liquid crystal display) that may be utilized to present a digital image to the user. Display 110 is limited by the size of digital camera and accordingly only one entire digital image of appreciable detail is typically presented on display 110 at any one time. User interface controls 111 may be utilized to traverse through the digital images stored in non-volatile memory 108.

The operation mode of digital camera 100 may be controlled by mode control code 112 stored in ROM 107. In representative embodiments, mode control code 112 determines the operational mode by examining the pitch orientation of digital camera 100. The pitch orientation of digital camera 100 may be determined by examining a signal generated by orientation sensor 113. When mode control code 112 determines that the digital camera is oriented in a manner indicative of the user positioning digital camera 100 optimally for viewing of display 110, mode control 112 may cause digital camera 100 to operate in an image review mode. Otherwise, mode control 112 may cause digital camera 100 to operate in an image capture mode.

Figure 2:
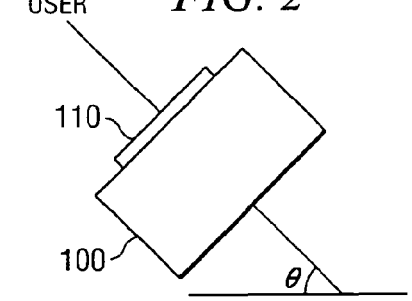
FIG. 2 depicts a digital camera oriented in a manner suitable for activation of an image review mode according to representative embodiments.

FIG. 2 depicts digital camera 100 oriented according to a pitch angle within a predetermined range for operation within an image review mode according to representative embodiments. As shown in FIG. 2, the user has positioned digital camera 100 in a manner that is comfortable for the user. Moreover, the user has oriented digital camera 100 to possess a pitch angle (denoted by θ). The reason that the user typically orients digital camera in this manner is the viewing angle defined by commonly implemented displays. Specifically, liquid crystal displays (which are commonly utilized in digital cameras) have limited viewing angles. Thus, the limited viewing angle limits the relative orientation of digital camera 100 relative to the user for optimal viewing. Of course, a user will most likely not orient digital camera 100 to the exact pitch angle each time that the user operates the camera in the image review mode. However, more often than not, the pitch angle associated with the image review mode will experience relatively limited variation (e.g., ±10°).

Figure 3:
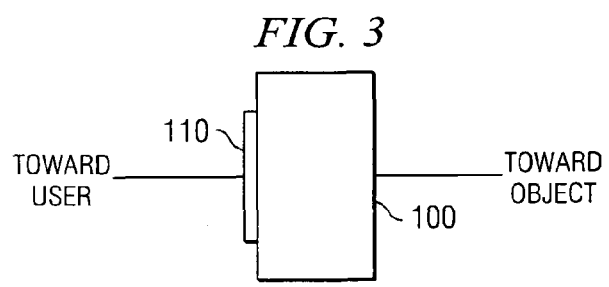
FIG. 3 depicts a digital camera oriented in a manner suitable for activation of an image capture mode according to representative embodiments.

FIG. 3 depicts digital camera 100 oriented to capture an image of an object or scene. As shown in FIG. 3, digital camera 100 is not positioned in a manner that maximizes the comfort of the user. Instead, the orientation of digital camera 100 is defined by its relative position relative the object to be imaged. Thus, digital camera 100 is positioned in a manner so that the captured digital image is relatively "flat." Accordingly, digital camera 100 does not possess an appreciable angle of pitch orientation as shown in FIG. 3.

Figure 4:
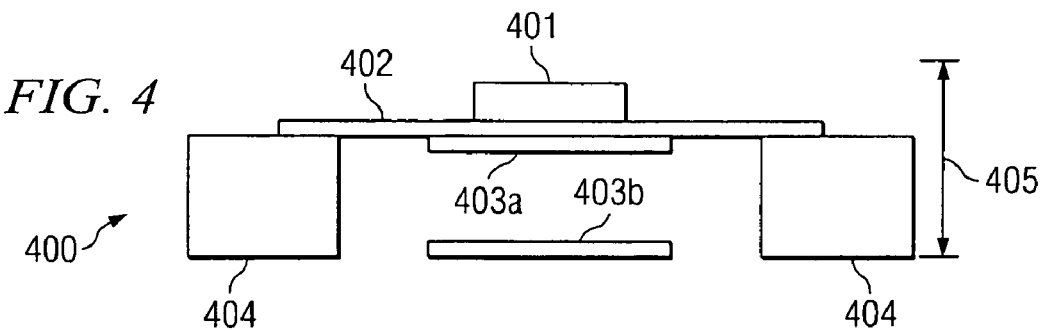
FIG. 4 depicts a known accelerometer design suitable for implementation of representative embodiments.

By employing orientation sensor 113, the pitch angle of digital camera 100 may be determined. Orientation sensor 113 may be implemented utilizing any number of mechanisms. For example, orientation sensor 113 may be implemented utilizing micro-electro-mechanical system (MEMs) design. FIG. 4 depicts MEMs accelerometer 400 according to a known MEMs design. MEMs accelerometer 400 includes inertial element 401 which is mechanically coupled to and suspended by cantilever 402. Cantilever 402 is disposed across blocks 404a and 404b. When inertial element 401 is subject to acceleration (by gravity, for example) in a direction along axis 405, inertial element 401 causes cantilever 402 to deform. When cantilever 402 deforms, the distance between electrostatic plates 403a and 403b changes. The distance between electrostatic plates 403a and 403b may be measured by measuring the capacitance associated with electrostatic plates 403a and 403b thereby enabling the amount of acceleration to be measured.

If the user is not moving digital camera 100 (i.e., the user is holding digital camera still during image review or image capture), the acceleration experienced by digital camera 100 is limited to gravitational acceleration. Specifically, when MEMs accelerometer 400 is positioned "horizontally," the measured acceleration will be maximized. When MEMs accelerometer 400 is positioned "vertically," the measured acceleration will be minimized. The angle between the horizontal and vertical positions may be determined by interpolation.

Figure 5:
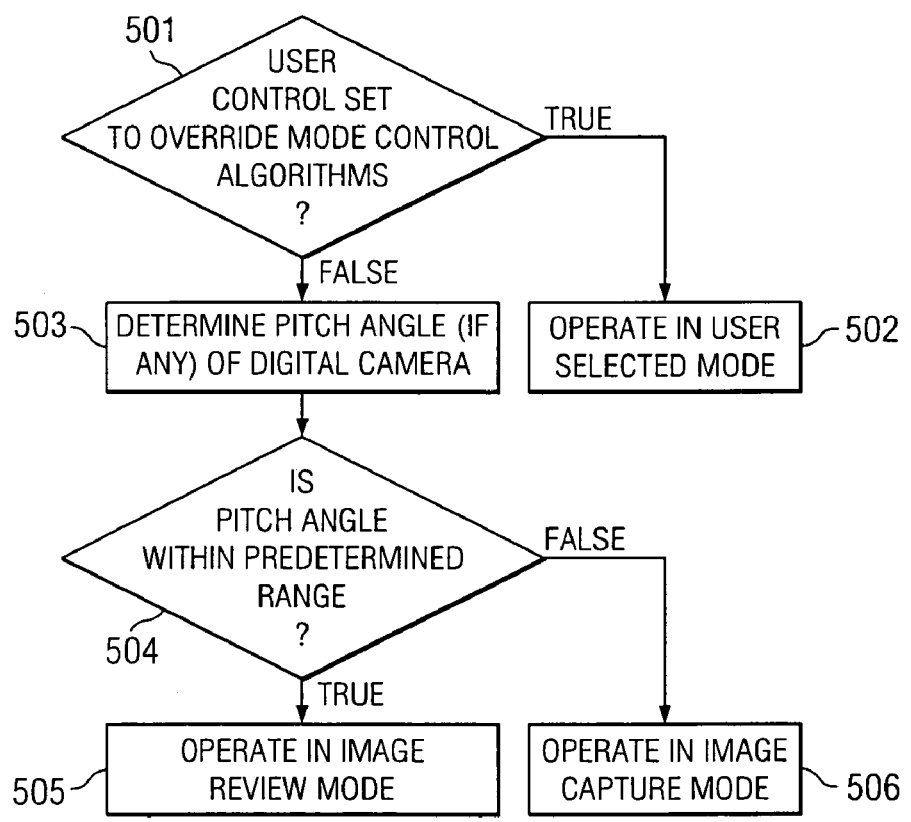
FIG. 5 depicts a flowchart for controlling an operating mode of an image device according to representative embodiments.

FIG. 5 depicts a flowchart for controlling an operational mode of digital camera 100 according to representative embodiments. The process flow of the flowchart may be implemented utilizing any number of logic implementations. For example, the process flow may be implemented utilizing suitable processor executable code defining mode control code 112 stored in ROM 107.

In step 501, a logical determination is made to determine whether a user control has been set to override the mode control algorithm. If the logical determination is true, the process flow proceeds to step 502, where digital camera 100 is operated in the mode selected by the user. If the logical determination is false, the process flow proceeds to step 503 where the pitch angle of digital camera 100 is determined. In step 504, a logical determination is made to determine whether the pitch angle is within a predetermined range. If the logical determination is true, the process flow proceeds to step 505 where digital camera 100 is operated in image review mode. If the logical determination is false, the process flow proceeds to step 506 where digital camera 100 is operated in image capture mode.

By adapting an imaging device to be operated according to the orientation of the imaging device, representative embodiments provide an image device which is more responsive to user expectations. The user is not required to manually control the operation mode. The user may simply position the imaging device in an intuitive manner for each mode and the imaging device will automatically respond.

What is claimed is:

1. A method for setting an image capture device to one of a plurality of available operational modes for said image capture device, said method comprising:

using an accelerometer with an inertial element mechanically coupled to and suspended by a cantilever, wherein the cantilever is coupled to spaced apart electrostatic plates, and indicating a distance between the electrostatic plates when the inertial element causes the cantilever to deform for determining an angle of pitch orientation of said image capture device and for generating a signal related to the angle of pitch orientation based on the distance between the electrostatic plates;

setting said image capture device to said one of said plurality of operational modes if said angle of pitch orientation is within a predetermined angle range associated with said one of said plurality of operational modes;

presenting on a display one of an image from memory and an image currently captured by said image capture device if said angle of pitch orientation is within the predetermined angle range; and ceasing to present images on the display in response to the signal related to the angle of pitch orientation and in response to input received from user input control.

2. The method of claim 1 wherein said plurality of operational modes comprises an image capture mode and an image review mode.

3. The method of claim 2 further comprising:
setting said image capture device to operate within said image capture mode when said angle of pitch orientation is not within said predetermined range.

4. The method of claim 2 further comprising:
displaying a real-time image captured by said image capture device on a display when said image capture device is set to operate according to said image capture mode.

5. The method of claim 2 further comprising:
setting said image capture device to said image review mode when said angle of pitch orientation is not within said predetermined range.

6. The method of claim 5 further comprising:
displaying an image stored in memory on a display when said image capture device is set to operate according to said image review mode.

7. The method of claim 1 wherein said determining includes determining a value associated with a signal from a micro-electro-mechanical system (MEMs) sensor.

8. The method of claim 7 wherein said MEMs sensor includes at least one accelerometer to generate said signal.

9. An imaging device, comprising:
an image capturing component for creating a digital image from a received optical image;
a display for displaying an image;
a memory for storing a plurality of digital images;
an accelerometer with an inertial element mechanically coupled to and suspended by a cantilever, wherein the cantilever is coupled to spaced apart electrostatic plates configured to indicate a distance between the electrostatic plates when an inertial element causes the cantilever to deform;
a pitch orientation sensor configured to use the distance of the accelerometer for generating a signal related to a pitch angle of said imaging device;
user interface control logic for presenting, on said display, one of an image from the memory and an image currently captured by said image capturing component in response to a signal from said pitch orientation sensor; and
wherein said user interface logic ceases to control said display in response to said signal indicative of said pitch angle and in response to input received from a user input control.

10. The imaging device of claim 9 wherein said user interface control logic determines whether said signal indicative of said pitch angle is within a predetermined range.

11. The imaging device of claim 10 wherein said user interface control logic presents, on said display, an image from memory when said signal indicative of said pitch angle is within a predetermined range.

12. The imaging device of claim 9 wherein said pitch orientation sensor is a micro-electro-mechanical system (MEMs) sensor.

13. The imaging device of claim 12 wherein said MEMs sensor includes at least one accelerometer to generate said signal indicative of said pitch angle.

14. An imaging system, comprising:
means for capturing an image;
means for displaying an image;
means for storing images;
accelerometer means having an inertial element mechanically coupled to and suspended by a cantilever, wherein the cantilever is coupled to spaced apart electrostatic plates;
means for indicating a distance between the electrostatic plates when the inertial element causes the cantilever to deform;
sensor means configured to use the distance between the electrostatic plates of the accelerometer means for determining an angle of pitch orientation of said system and for generating a signal related to the angle of pitch orientation;
control means for causing said means for displaying to display an image from said means for storing when said angle of pitch orientation is within a predetermined angle range; and
means for ceasing to control the display in response to the signal related to the angle of pitch orientation and in response to input received from user input control.

15. The imaging system of claim 14 wherein said control means further causes said means for displaying to display an image currently captured by said means for capturing when said angle of pitch orientation is not within said predetermined angle range.

16. The imaging system of claim 14 further comprising:
an input means for receiving user input, wherein said control means ceases to operate in response to predefined input from said input means.

17. The imaging system of claim 14 wherein said sensor means determines a value associated with a signal from a micro-electro-mechanical system (MEMs) sensor.

18. The imaging system of claim 17 wherein said MEMs sensor includes at least one accelerometer to generate said signal.

* * * * *